United States Patent [19]
Radlmann et al.

[11] 3,969,318
[45] July 13, 1976

[54] SUBSTANTIALLY NON-INFLAMMABLE ACRYLONITRILE COPOLYMERS CONTAINING ANTIMONY

[75] Inventors: Eduard Radlmann; Heinz Schaffner; Günter Lorenz; Günther Nischk, all of Dormagen, Germany

[73] Assignee: Bayer Aktiengesellschaft, Leverkusen, Germany

[22] Filed: Sept. 12, 1975

[21] Appl. No.: 612,702

[30] Foreign Application Priority Data
Sept. 12, 1974  Germany.............................. 2443573

[52] U.S. Cl............................. 260/45.75 B; 260/446
[51] Int. Cl.$^2$............................................. C08J 3/20
[58] Field of Search ........... 260/45.75 B; 106/15 FP

[56] References Cited
UNITED STATES PATENTS

| | | | |
|---|---|---|---|
| 3,640,914 | 2/1972 | Ogawa et al. ................. | 260/45.75 B |
| 3,721,581 | 3/1973 | Teramura et al............. | 260/45.75 B |
| 3,728,367 | 4/1973 | Yates .......................... | 260/45.75 B |
| 3,748,302 | 7/1973 | Jones........................... | 260/45.75 B |
| 3,752,837 | 8/1973 | Okuto et al. ................. | 260/45.75 B |
| 3,763,202 | 10/1973 | Cumbo et al................ | 260/45.75 B |
| 3,766,065 | 10/1973 | Chay et al. .................. | 260/45.75 B |
| 3,910,977 | 10/1975 | Knowles...................... | 260/446 |

Primary Examiner—V. P. Hoke
Attorney, Agent, or Firm—Plumley and Tyner

[57] ABSTRACT

The invention relates to a composition of matter which comprises A) from 95 to 99.9 % by weight of a copolymer of acrylonitrile, a vinyl and/or vinylidene halide and, optionally, at least one other copolymerisable compound; and B) from 0.1 to 5 % by weight of a substantially water-insoluble complex antimony compound containing amide groups, the complex antimony compound being obtainable by esterifying an α-hydroxy polycarboxylic acid with a polyol, reacting the esterification product with an antimony oxide in a polar organic solvent adding a monoisocyanate to the resulting solution in such a quantity that the free carboxyl groups are converted into the corresponding amide groups, and a process for the production of these compositions of matter.

4 Claims, No Drawings

SUBSTANTIALLY NON-INFLAMMABLE ACRYLONITRILE COPOLYMERS CONTAINING ANTIMONY

This invention relates to copolymers of acrylonitrile and vinyl or vinylidene halides which, through the additional incorporation of special complex antimony compounds, can be processed into substantially non-inflammable shaped articles. More particularly, the invention relates to self-extinguishing textile filaments which, after processing into knitted articles of filament and fibre yarn, withstand without exception the vertical burning test according to DIN 53 906.

It is known that the inflammability and burning properties of polyacrylonitrile are reduced by copolymerising acrylonitrile with halogen-containing comonomers such as, for example, vinyl or vinylidene chloride. However, the quantity of halogen-containing comonomers is limited on account of the no longer satisfactory technological properties of shaped articles produced from the copolymers. In the rarest cases, therefore, the vinyl or vinylidene chloride content is greater then 45% by weight. Since fibres of copolymers of this kind only withstand the vertical burning test according to DIN 53 906 with certain limitations, the need for a further improvement in non-inflammability, i.e. for safe passing of the test, is of considerable significance. Halogen-containing substrates, in conjunction with antimony, are known to have a synergistic effect upon the substantial non-inflammability of polymers. For example, it is known that insoluble antimony compounds, such as antimony oxide or antimony sulphide, can be introduced into polymers in order to obtain improved flameproof properties. Antimony compounds of this kind have two disadvantages. On the one hand, they are insoluble and this causes difficulties, such the fouling of spinnerets and filters where the polymers are processed from solutions. On the other hand, fibres or films undergo a reduction in gloss as a result of pigmenting of these coarsely disperse particles. In addition, the flameproofing effect is governed by the surface size of the particles.

In order to eliminate the problem of the substantial insolubility of antimony compounds, soluble antimony(III)tartaric acid complexes have been proposed as flameproofing additives to polymers in U.S. Patent Specification No. 3,728,367, whilst soluble antimony(V)-α-hydroxy carboxylic acid complexes have been proposed for the same purpose in German Offenlegungsschrift No. 2,159,174. Both types of compounds are produced from the corresponding antimony halides, and halogen-free and halogen-containing complexes can be formed. The major disadvantage of the halogen-free complexes is their outstanding solubility in water, as a result of which a considerable proportion of the active antimony compound migrates into the aqueous phase and, hence, becomes inactive during the usual aqueous aftertreatments to which shaped articles, such as films and fibres, are subjected. The disadvantage of the halogen-containing complexes is their ready hydrolysability resulting in the formation of antimony oxide, which is insoluble in organic solvents, and in addition hydrogen halide which gives rise to corrosion of the apparatus used.

Accordingly, there is a need for antimony-containing flameproofing agents which, before processing into shaped articles of acrylonitrile-vinyl or vinylidene halide copolymers, may be added to the corresponding polymer solutions in polar organic solvents without any disintegration phenomena, which are insoluble or substantially insoluble in water and, hence, remain quantitatively in the shaped articles, which do not give rise to any corrosion problems and, which in addition, do not adversely affect the physical properties of the products.

It has now been found that water-insoluble complex antimony compounds containing amide groups, prepared from α-hydroxy polycarboxylic acids, polyols, antimony oxide and monoisocyanates, may be added without disintegration phenomena to acrylonitrile-vinyl or vinylidene halide copolymer solutions in polar solvents such as, for example, dimethyl formamide, and that these mixtures may be further processed into filaments without the additives giving rise to any corrosion in the solution containers, pipes, filter presses or spinning units. It has also been found that the filaments thus produced, following the usual aqueous aftertreatments, such as stretching and washing, have substantially the original antimony content by virtue of the insolubility of the additives in water, and withstand without exception the vertical burning test according to DIN 53 906 by virtue of the synergistic effect of the antimony.

Accordingly, the invention relates to a composition of matter which comprises (A) from 95 to 99.9% by weight of a copolymer of acrylonitrile and a vinyl halide, a vinylidene halide or a mixture thereof and, optionally, at least one other copolymerisable compound; and (B) from 0.1 to 5% by weight of a substantially water-insoluble complex antimony compound containing amide groups, the complex antimony compound being obtainable by esterifying an α-hydroxy polycarboxylic acid with a polyol in a molar ratio of the carboxyl groups to the hydroxyl groups in the polyol of at least 2 : 1 and in the presence of an acid transesterification catalyst, reacting the esterification product with an antimony oxide in a polar organic solvent at a temperature in the range of from 100° to 200°C to form a clear solution still containing free carboxyl groups, adding a monoisocyanate to the resulting solution at a temperature below 100° C in such a quantity that the free carboxyl groups are converted into the corresponding amide groups, and optionally removing the solvent.

The invention also relates to shaped articles of these copolymers, more especially filaments and fibres.

The complex antimony compounds added in accordance with the invention may be prepared as follows: the α-hydroxy polycarboxylic acid, for example tartaric acid, is condensed in known manner with a polyol, for example ethylene glycol, in a molar ratio of 2 : 1 (ratio of the carboxyl groups to the hydroxyl groups in the polyol) in the presence of an acid transesterification catalyst, for example an acid ion exchanger, at temperatures in the range of from 100° to 200°C and preferably at temperatures in the range of from 100° to 180°C, an inert gas, for example nitrogen, being passed over during the condensation reaction. The resulting precondensate is then dissolved in a polar solvent and heated with antimony (III) or (V) oxide, preferably in a molar ratio of 2 : 1 to 4 : 1 (ratio of free carboxyl groups to antimony) at temperatures in the range of from 100° to 200°C, preferably at temperatures in the range of from 100° to 180°C, while nitrogen is passed over, until a solution is formed, water being eliminated in the meanwhile. The solution is then cooled to temperatures below 100°C and diluted with more solvent according to the particular application envisaged, followed by addition of the stoichiometric quantity (based on the free carboxyl groups) of a monoisocyanate, preferably at a temperature in the range of from 40° to 60°C. Carbonamide groups are formed with the evolution of carbon dioxide. The solutions obtained are substantially colourless and may readily be used as flameproofing additives. However, if the solvent is removed by distillation, a pale yellowish solid residue is obtained.

The polyols used are compounds corresponding to the general formula:

$$R(OH)_n$$

in which R is a straight-chain or branched aliphatic radical having from 2 to 20 carbon atoms, and n is a number from 2 to 6. Examples of compounds such as these are ethylene glycol, 1,4-butane diol, 1,6-hexane diol, glycerol, pentaerythritol and mannitol.

Suitable α-hydroxy carboxylic acids are, for example, tartaric acid, malic acid, citric acid and mucic acid. Tartaric acid and citric acid are preferably used.

The antimony oxides used are $Sb_2O_3$ and $Sb_2O_5$, preferably $Sb_2O_3$.

Suitable monoisocyanates are compounds corresponding to the general formula:

$$R_1-N=C=O.$$

in which $R_1$ is a straight-chain or branched alkyl radical having from 1 to 20 carbon atoms or represents the radical:

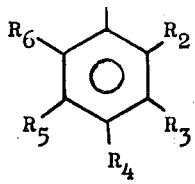

where $R_2$, $R_3$, $R_4$, $R_5$ and $R_6$ may be the same as or different from one another and may represent hydrogen, an alkyl radical having from 1 to 5 carbon atoms, fluorine, chlorine or bromine.

Suitable polar organic solvents are, for example, formamide, monomethyl formamide, dimethyl formamide, acetamide, monomethyl acetamide, dimethyl acetamide, tetramethyl urea, N-methyl pyrrolidone and dimethyl sulphoxide. It is particularly preferred to use dimethyl formamide or dimethyl acetamide as solvent.

According to the invention, copolymers to which the flameproofing complex antimony compound is added are copolymers of acrylonitrile, vinyl and/or vinylidene halides, preferably vinyl chloride and/or vinylidene chloride and, optionally, other copolymerisable compounds which may improve dyeability with acid or basic dyes.

It has proved to be particularly suitable to use polymers containing at least 40% by weight of acrylonitrile units and up to 60% by weight of units of at least one vinyl halide.

Copolymerisable compounds which improve dyeability are generally known. It is particularly preferred to use vinyl, allyl, styrene or methallyl sulphonic acids, or acryloyl amidobenzene benzene sulphimide and their sodium salts.

The copolymer mixtures according to the invention are prepared by mixing solutions of the complex antimony compounds with solutions of the acrylonitrile polymers in a suitable quantitative ratio and removing the solvent.

In many cases, it is best to process the solution of complex and polymer into shaped articles directly, i.e. without intermediate isolation of the flameproof mixture.

Suitable solvents are those mentioned as advisable for the preparation of the antimony complexes.

Fibres produced from solution mixtures of this kind by known dry spinning or wet spinning processes may readily be processed into textile materials with a variety of different weights per unit area. The textile materials show a high gloss and pass the vertical burning test DIN 53 906 without any limitations. They are self-extinguishing The following Examples are to further illustrate the invention without limiting it. Unless otherwise stated, in the Examples all percentages are by weight.

EXAMPLE 1 (Solution A)

480 parts by weight of tartaric acid and 99.2 parts by weight of ethylene glycol in the presence of 3.2 parts by weight of an acid ion exchanger (Lewatit S 100, a product of Bayer AG) are condensed with stirring for 5 hours at 140°C in a condensation apparatus while nitrogen is passed over, until the stoichiometric quantity of 57.6 parts by weight of water has distilled off. The esterification product is then dissolved in 768 parts by weight of dimethyl formamide. Following the addition of about 20 parts by weight of active carbon, the solution is filtered off from the ion exchanger and the active carbon. 116.6 parts by weight of antimony trioxide are added to the solution obtained, followed by heating with stirring at 150°C, while nitrogen is passed over, until after about 40 minutes a clear solution is obtained and the stoichiometric quantity of water has distilled off. The solution is then cooled to 20°C and phenyl isocyanate is added dropwise at a temperature in the range of from 20° to 40°C until no more carbon dioxide is given off. The consumption of phenyl isocyanate amounts to 182 parts by weight. The solution is then stirred for about 2 hours at 40°C.

The solution obtained is readily miscible and compatible with solutions of copolymers of acrylonitrile and vinyl or vinylidene chloride. The complex antimony compound precipitates on the addition of water to its dimethyl formamide solution.

EXAMPLE 2 (Solution B)

In a condensation apparatus, 300 parts by weight of tartaric acid together with 118 parts by weight of 1,6-hexane diol and 3 parts by weight of an acid ion exchanger (Lewatit S 100, a product of Bayer AG) are heated with stirring for about 10 hours at 140°C, while nitrogen is passed over, until the stoichiometric quantity of water (36 parts by weight) has distilled off. The reaction product is dissolved in 516 parts by weight of dimethyl acetamide and the solution is freed from the acid catalyst by filtration. 102.9 parts by weight of antimony trioxide are then added and the dispersion is heated with stirring for approximately 50 minutes at 150°C, while nitrogen is passed over, until a clear solution is obtained. After cooling to approximately 25°C, a solution of 34.2 parts by weight of methyl isocyanate in 100 parts by weight of dimethyl acetamide is added dropwise in such a way that the temperature does not exceed 40°C. The solution is then stirred for 2 hours at 40°C. A slight deposit may form from the almost colourless solution in the event of prolonged standing, although it is completely dissolved on admixture with an acrylonitrile-vinyl chloride copolymer solution in dimethyl acetamide. The complex antimony compound precipitates on the addition of water to its solution.

EXAMPLE 3 (Solution C)

Following the procedure of Example 2, 210 parts by weight of citric acid and 62 parts by weight of ethylene glycol in the presence of 2 parts by weight of an acid ion exchanger (Lewatit S 100, a product of Bayer AG) are condensed under nitrogen for 6 hours at 140°C. The condensation product is then dissolved in 285 parts by weight of dimethyl formamide and filtered while still warm. Following the addition of 43.7 parts by weight of antimony trioxide, the mixture is heated for approximately 40 minutes at 150°C until a clear solution is obtained. The solution is then cooled to room temperature, followed by the addition in portions of 75.2 parts by weight of 3,4-dichlorophenyl isocyanate. The temperature should not exceed 40°C. The solution is then stirred for 2 hours at 40°C.

The complex antimony compound is insoluble in water, whilst its solution is compatible with solutions of copolymers of acrylonitrile and vinyl or vinylidene halides.

EXAMPLE 4 (Solution D)

In an apparatus of the kind described in Example 1, 1012 parts by weight of glycerol and 4950 parts by weight of tartaric acid in the presence of 33 parts by weight of an acid ion exchanger (Lewatit S 100, a product of Bayer AG) are condensed with stirring under a nitrogen atmosphere for about 6 hours at a bath temperature of 170°C until no more water distils off. The condensation product is then dissolved in 18,565 parts by weight of dimethyl formamide and filtered following the addition of 500 parts by weight of active carbon. 1202 parts by weight of antimony trioxide are added to the filtered solution, followed by heating at 140° to 150°C, while nitrogen is passed over, until a clear, pale yellowish solution has formed from the dispersion. After cooling to room temperature, 4653 parts by weight of 3,4-dichlorophenyl isocyanate are added in portions with evolution of carbon dioxide in such a way that the temperature does not exceed 50° to 60°C.

The antimony compound precipitates on the addition of water.

A solution of the complex antimony compound in dimethyl formamide is compatible in any mixing ratios with dimethyl formamide solutions of copolymers of acrylonitrile and vinyl or vinylidene chloride.

EXAMPLE 5

The complex antimony solutions A, B, C and D described in Examples 1 to 4 are added in various quantities to a 35% dimethyl formamide solution of an acrylonitrile-vinylidene chloride copolymer of 58.6% of acrylonitrile, 38.5% of vinylidene chloride and 2.9% of sodium methallyl sulphonate with a K-value according to Fikentscher (Cellulosechemie 13 (1932), page 58) of 75.3. The resulting polymer solutions with the antimony additives are spun into filaments by conventional dry-spinning processes, stretched in hot water and washed in the usual way.

The results of the vertical burning test according to DIN 53 906 carried out on pieces of knitting produced from the resulting fibre yarns are set out in Table 1 below:

Table 1

| Solution added | Antimony content [%] Original | Antimony content [%] Found in the piece of the knitting | Vertical burning test according to DIN 53 906 Ignition time [secs.] | Vertical burning test according to DIN 53 906 Burning time *[secs.] | Vertical burning test according to DIN 53 906 Distance burnt [cm] max: 35 cm |
|---|---|---|---|---|---|
| Comparison test without any addition | | | 3 | 48 | 32.5 |
| | | | 3 | 29 | 32.5 |
| | | | 3 | 27 | 20.0 |
| | | | 15 | 25 | 32.5 |
| | | | 15 | 27 | 32.5 |
| | | | 15 | 26 | 32.5 |
| A | 0.5 | 0.5 | 3 | 16 | 15.0 |
| | | | 3 | 16 | 13.0 |
| | | | 3 | 19 | 14.5 |
| | | | 15 | 12 | 9.5 |
| | | | 15 | 15 | 11.0 |
| | | | 15 | 17 | 11.5 |
| A | 2.0 | 1.9 | 3 | — | 1.0 |
| | | | 3 | — | 1.0 |
| | | | 3 | 1 | 1.5 |
| | | | 15 | — | 1.5 |
| | | | 15 | 1 | 2.0 |
| | | | 15 | — | 1.0 |
| B | 2.5 | 2.5 | 3 | — | 1.0 |
| | | | 3 | — | 1.5 |
| | | | 3 | — | 1.0 |
| | | | 15 | — | 1.5 |
| | | | 15 | — | 1.5 |
| | | | 15 | — | 1.0 |
| B | 1.5 | 1.4 | 3 | — | 1.5 |
| | | | 3 | 1 | 3.5 |
| | | | 3 | — | 2.0 |
| | | | 15 | 1 | 3.0 |
| | | | 15 | — | 1.5 |
| | | | 15 | 1 | 2.0 |
| C | 1.8 | 1.6 | 3 | 1 | 2.5 |
| | | | 3 | — | 1.5 |
| | | | 3 | — | 1.0 |
| | | | 15 | — | 1.0 |
| | | | 15 | 1 | 1.5 |
| | | | 15 | 1 | 1.5 |

Table 1-continued

| Solution added | Antimony content [%] | | Vertical burning test according to DIN 53 906 | | |
|---|---|---|---|---|---|
| | Original | Found in the piece of the knitting | Ignition time [secs.] | Burning time *[secs.] | Distance burnt [cm] max: 35 cm |
| D | 1.7 | 1.7 | 3 | — | 1.0 |
| | | | 3 | — | 1.0 |
| | | | 3 | — | 1.0 |
| | | | 15 | 1 | 2.0 |
| | | | 15 | — | 1.0 |
| | | | 15 | 2 | 1.5 |

*following removal of the ignition flame

EXAMPLE 6

The complex antimony solutions A to D described in Examples 1 to 4 are added in various quantities to a 26% dimethyl acetamide solution of an acrylonitrile-vinyl chloride copolymer (composition: 51.2% of acrylonitrile, 46.6% of vinyl chloride and 2.2% of sodium methallyl sulphonate) with a K-value (according to Fikentscher) of 80.4. The resulting polymer solutions are processed into filaments by the dry spinning process, stretched in hot water and washed in the usual way. The filaments are then processed into fibre yarns. Pieces of knitting produced from the resulting fibre yarns are subjected to the vertical burning test according to DIN 53 906. The results of these tests are set out in Table 2 below.

What we claim is:

1. A composition of matter which comprises
A. from 95 to 99.9% by weight of a copolymer of acrylonitrile and a vinyl halide, a vinylidene halide or a mixture thereof and, optionally, at least one other copolymerisable compound: and
B. from 0.1 to 5% by weight of a substantially water-insoluble complex antimony compound containing amide groups, the complex antimony compound being obtainable by esterifying an α-hydroxy polycarboxylic acid with a polyol in a molar ratio of the carboxyl groups to the hydroxyl groups in the polyol of at least 2 : 1 and in the presence of an acid transesterification catalyst, reacting the esterification product with an antimony oxide in a polar organic solvent at a temperature in the range of from 100° to 200° C to form a clear solution still containing free carboxyl groups, adding a monoiso- Table 2

| Solution Added | Antimony content [%] | | Vertical burning test according to DIN 53 906 | | |
|---|---|---|---|---|---|
| | Original | Found in the piece of the knitting | Ignition time [secs.] | Burning time* [secs.] | Distance burnt [cm] max: 35 cm |
| — | 0 | 0 | 3 | 25 | 32.0 |
| Comparison test without any addition | | | 3 | 28 | 31.0 |
| | | | 3 | 25 | 31.5 |
| | | | 15 | 24 | 32.0 |
| | | | 15 | 25 | 28.5 |
| | | | 15 | 24 | 31.0 |
| A | 1.8 | 1.7 | 3 | — | 2.5 |
| | | | 3 | 1 | 1.0 |
| | | | 3 | — | 1.5 |
| | | | 15 | — | 3.0 |
| | | | 15 | 1 | 3.5 |
| | | | 15 | — | 2.5 |
| B | 0.8 | 0.8 | 3 | 11 | 10.5 |
| | | | 3 | 7 | 12.5 |
| | | | 3 | 8 | 12.0 |
| | | | 15 | 10 | 11.0 |
| | | | 15 | 10 | 13.5 |
| | | | 15 | 9 | 9.5 |
| B | 1.5 | 1.4 | 3 | 1 | 3.5 |
| | | | 3 | 1 | 2.5 |
| | | | 3 | 3 | 4.0 |
| | | | 15 | 2 | 4.0 |
| | | | 15 | — | 3.5 |
| | | | 15 | 1 | 3.0 |
| B | 2.0 | 1.9 | 3 | — | 1.0 |
| | | | 3 | — | 1.0 |
| | | | 3 | — | 4.0 |
| | | | 15 | — | 2.5 |
| | | | 15 | — | 2.5 |
| | | | 15 | — | 1.5 |
| C | 1.9 | 1.8 | 3 | — | 2.0 |
| | | | 3 | 1 | 2.5 |
| | | | 3 | — | 2.5 |
| | | | 15 | — | 2.5 |
| | | | 15 | — | 3.0 |
| | | | 15 | — | 4.0 |
| D | 2.8 | 2.4 | 3 | — | 1.5 |
| | | | 3 | — | 0.5 |
| | | | 3 | — | 2.0 |
| | | | 15 | — | 2.0 |
| | | | 15 | — | 1.0 |
| | | | 15 | — | 1.5 |

*following removal of the ignition flame cyanate to the resulting solution at a temperature below 100° C in such a quantity that the free carboxyl groups are converted into the corresponding amide groups, and optionally removing the solvent.

2. The composition of matter of claim 1, wherein said copolymer comprises at least 40% by weight of acrylonitrile and up to 60% by weight of a vinyl halide, a vinylidene halide or a mixture thereof.

3. The composition of matter of claim 1, wherein in said copolymer said other copolymerisable compound is a monomer with acid or basic groups.

4. A process for producing a composition of matter which comprises
    A. from 95 to 99.9% by weight of a copolymer of acrylonitrile and a vinyl halide, a vinylidene halide or a mixture thereof and, optionally, at least one other copolymerisable compound, and
    B. from 0.1 to 5% by weight of a water-insoluble complex antimony compound containing amide groups, which comprises initially preparing a solution of the complex antimony compound by esterifying an α-hydroxy polycarboxylic acid with a polyol in a molar ratio of the carboxyl groups to the hydroxyl groups in the polyol of at least 2 : 1 and in the presence of an acid transesterification catalyst, reacting an excess of the esterification product with an antimony oxide in a polar organic solvent at a temperature in the range of from 100° to 200° C to form a clear solution still containing free carboxyl groups, and adding a monoisocyanate to the resulting solution at a temperature below 100° C in such a quantity that the free carboxyl groups are converted into the corresponding amide groups; and mixing the resulting solution of the complex antimony compound with a solution of said copolymer of acrylonitrile, in such a ratio that the required mixing ratio is obtained following removal of the solvent.

* * * * *